(12) United States Patent
Moon

(10) Patent No.: US 11,115,702 B1
(45) Date of Patent: Sep. 7, 2021

(54) DEVICE FOR CONTROLLING TV VIEWING, CAPABLE OF BI-DIRECTIONAL VIDEO CALLING

(71) Applicant: Byung Chul Moon, Chungcheongbuk-do (KR)

(72) Inventor: Byung Chul Moon, Chungcheongbuk-do (KR)

( * ) Notice: Subject to any disclaimer, the term of this patent is extended or adjusted under 35 U.S.C. 154(b) by 0 days.

(21) Appl. No.: 16/973,050

(22) PCT Filed: Aug. 1, 2019

(86) PCT No.: PCT/KR2019/009624
§ 371 (c)(1),
(2) Date: Dec. 8, 2020

(87) PCT Pub. No.: WO2020/027606
PCT Pub. Date: Feb. 6, 2020

(30) Foreign Application Priority Data

Aug. 1, 2018 (KR) .......................... 10-2018-0089930

(51) Int. Cl.
*H04N 7/14* (2006.01)
*H04N 21/41* (2011.01)
*H04N 21/422* (2011.01)
*H04N 21/442* (2011.01)
*H04N 21/4363* (2011.01)

(52) U.S. Cl.
CPC ... *H04N 21/41265* (2020.08); *H04N 21/4222* (2013.01); *H04N 21/42202* (2013.01); *H04N 21/42203* (2013.01); *H04N 21/43635* (2013.01); *H04N 21/44218* (2013.01)

(58) Field of Classification Search
CPC ....... H04N 21/41265; H04N 21/42202; H04N 21/42203; H04N 21/4222; H04N 21/43635; H04N 21/44218
See application file for complete search history.

(56) References Cited

U.S. PATENT DOCUMENTS

| 2010/0231795 | A1* | 9/2010 | Choi | ...................... | H04N 5/765 |
| | | | | | 348/572 |
| 2011/0205329 | A1* | 8/2011 | Willis | ................ | H04N 21/4788 |
| | | | | | 348/14.08 |
| 2014/0208376 | A1* | 7/2014 | Bi | ........................ | H04N 21/488 |
| | | | | | 725/110 |

FOREIGN PATENT DOCUMENTS

| CN | 202127486 U | 1/2012 |
| KR | 10-1993-0003727 A | 2/1993 |

(Continued)

OTHER PUBLICATIONS

International Search Report for PCT/KR2019/009624 dated Nov. 28, 2019 from Korean Intellectual Property Office.

*Primary Examiner* — Kyu Chae
(74) *Attorney, Agent, or Firm* — Revolution IP, PLLC

(57) ABSTRACT

A device for controlling TV viewing, capable of bi-directional video calling, may: connect a TV and a smartphone via a communication network; transmit an image captured by an embedded camera to the smartphone; establish bi-directional TV video calling between the embedded camera, TV, and smartphone by displaying an image signal of the smartphone via the TV; control TV viewing by linking to the smartphone via the wireless communication network; and support video calling between the TV and smartphone via a simple button operation when the elderly, infirm, and children, young and old, who have difficulty using a separate communication means are in an emergency situation.

7 Claims, 8 Drawing Sheets

(56) References Cited

FOREIGN PATENT DOCUMENTS

| KR | 10-2002-0033151 A | 5/2002 |
|---|---|---|
| KR | 10-2016-0091191 A | 8/2016 |
| KR | 10-1758040 B1 | 7/2017 |

* cited by examiner

DEVICE FOR CONTROLLING TV VIEWING, CAPABLE OF BI-DIRECTIONAL VIDEO CALLING

TECHNICAL FIELD

The present invention relates to a device for controlling television (TV) viewing, and more specifically, to a device for controlling a TV viewing device capable of connecting a TV to a smart phone via a communication network, transmitting an image captured by a built-in camera to the smart phone, displaying an image signal of the smart phone through the TV to implement a TV bidirectional video call between the built-in camera, the TV, and the smart phone, and control TV viewing in linkage with the smart phone via a wireless communication network such that a bidirectional video call using a TV is performable without a separate communication device such as a smart phone.

BACKGROUND ART

Along with popularization and high-speed of the Internet, internet protocol (IP) televisions (TVs) have been manufactured in large size and high-definition, and such a trend of TVs being large in size and being high-definition is expected to be intensified. In addition, with the popularization of smart TVs, TVs are expected to have higher utilization.

However, despite such a change, TVs have remained at a level of being utilized as a one-way information transmission device.

In addition, even when TVs are already connected to the Internet, a communication with external devices is achieved using separate communication devices such as smart phones. That is, mostly, even with TVs of high definition, large size, and smart features, a video call is made through a smart phone, which has a relatively small screen, or a voice call is simply made.

This is a limitation in smooth communication of users with a low level of understanding of information transmission, such as the elderly and children. In addition, in an emergency where it is difficult to use a smart phone, there is no appropriate method of communication with external devices.

In addition, with the proliferation of single-person households in recent years, the number of generations living with companion animals is increasing, which frequently causes side effects, such as separation anxiety of companion animals and disturbance of a house due to the companion animals remaining alone when the owner leaves the house or goes to work. However, currently, methods of immediately identifying the situation of companion animals by the owner of the companion animals and properly controlling the situation stay at a level of using IP-Cameras, which are devices using a one-way video transmission method, because of the absence of an appropriate method, other than the owner's voice, of controlling companion animals that have separation anxiety and other problems.

In addition, when there are only children in the house, parents have no choice but to give the children the parents' smart phones for communication with the children, which causes overuse of smart phones because the children use the smart phones freely outside of parental control.

There is a need to develop a technology for obviating for the above described side effects using high-definition and large sized TVs without depending on smart phones.

In addition, in order to properly protect eyesight from excessive use of TV, there is a need to appropriately adjust the brightness and color of the TV screen according to the surrounding lighting conditions. However, adjusting functions embedded in TVs need to be manually adjusted by users frequently and most users are unaware of the adjusting functions, and currently there is no method of automatically controlling the functions. Due to the above described side effects and increasing dependence on smart phones, the number of people who wear glasses at an early age is increasing every year.

Accordingly, there is a need to develop apparatuses for automatically protecting eyesight of viewers by automatically adjusting the brightness and color of a TV screen according to changes in external lighting.

Modern people spend a considerable amount of time watching TV. It is recommended to watch TV at an appropriate distance and for an appropriate time to protect eyesight and maintain health.

However, in practice, children and toddlers have difficulty in observing the TV viewing distance and have negative effects due to excessive TV viewing.

Despite the drawbacks, parents do not have enough methods to control TV viewing when the children continue to watch TV or do not observe the TV viewing distance, so excessive verbal abuse or corporal punishment occurs, which may cause family feuds sometimes that lead to bad relationships between the parents and the children.

In addition, as TVs have recently become larger and improved, a TV is combined with a game console as an attempt to play various games through a TV screen, and various age groups from infants to teenagers seek pleasure through TVs.

As such, TV viewing occupies a large part of the family feuds, and currently, there is no solution for control of TV viewing.

DISCLOSURE

Technical Problem

The present invention is directed to providing a device for controlling television (TV) viewing that is capable of connecting a TV to a smart phone via a communication network, transmitting an image captured by an embedded camera to the smart phone, displaying an image signal of the smart phone through the TV to implement TV bidirectional video calling between the embedded camera, the TV, and the smart phone, and control TV viewing in linkage with the smart phone via a wireless communication network such that bidirectional video calling using a TV is performable without a separate communication device, such as a smart phone.

The present invention is directed to providing a method of protecting eyesight of viewers by automatically adjusting the brightness and color of a TV according to a change in external lighting.

Technical Solution

One aspect of the present invention provides a device for controlling television (TV) viewing capable of bi-directional video calling including:

a first high-definition multimedia interface (HDMI) inputter configured to receive a first image data signal from a first multimedia interface connector mounted on a digital image source;

an HDMI outputter configured to output a signal processed image data signal to a second multimedia interface connector mounted on a TV;

an interface signal processor configured to receive the first image data signal from the first multimedia interface connector and perform signal processing on the first image data signal according to a plurality of channels and output the signal processed first image data signal to the second multimedia interface connector;

a controller configured to receive an HDMI signal through wireless communication and allow the interface signal processor to perform signal processing on the received HDMI signal according to a plurality of channels and output the signal processed HDMI signal to the second multimedia interface connector; and a wireless communication module connected to the controller and configured to receive the HDMI signal through wireless communication, wherein the controller is configured to receive and process a control signal generated by manipulation of the smart phone such that the smart phone performing wireless communication transmits and receives interactive content, generate a response signal to the control signal transmitted from the smart phone, and transmit the generated response signal to the smart phone.

The device may further include a multi-sensor module electrically connected to the controller, and the multi-sensor module may include:

an illuminance sensor configured to measure an intensity of light of surroundings, generate an illuminance sensor value, and transmit the generated illuminance sensor value to the controller;

a human body detection sensor configured to emit infrared rays to a subject and receive infrared rays emitted from the subject to detect movement of the subject;

an infrared light emitting diode (LED) configured to emit infrared rays to the subject;

a built-in microphone configured to collect voice signals of surroundings and transmit the voice signals to the controller; and a built-in camera configured to capture an image of surroundings to generate an image signal and transmit the generated image signal to the controller.

The controller may be configured to, in response to receiving a response signal to a video call request signal from the smart phone, perform a video and voice call protocol to enable a video call to configure a communication environment in which the TV and the smart phone perform a video call, transmit an image captured by the built-in camera to the smart phone, receive an image data signal and a voice data signal from the smart phone through the digital image source or the wireless communication module and output the image data signal and the voice data signal to the TV to perform a bi-directional video call between the built-in camera, the TV, and the smart phone.

Advantageous Effects

As is apparent from the above, the present invention connects a television (TV) to the smart phone through a communication network to implement a TV interactive content control service so that video calls, security functions, and TV viewing control functions can be performed.

The present invention can implement various multimedia services by expanding a high-definition multimedia interface (HDMI) channel to two channels.

The present invention can support a video call between a TV and a smart phone with a simple button operation in case of an emergency situation of the elderly, infants, and children who have difficulty in using a separate communication device.

BEST MODES OF THE INVENTION

In the specification, the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof unless the context clearly dictates otherwise.

Figure 1:
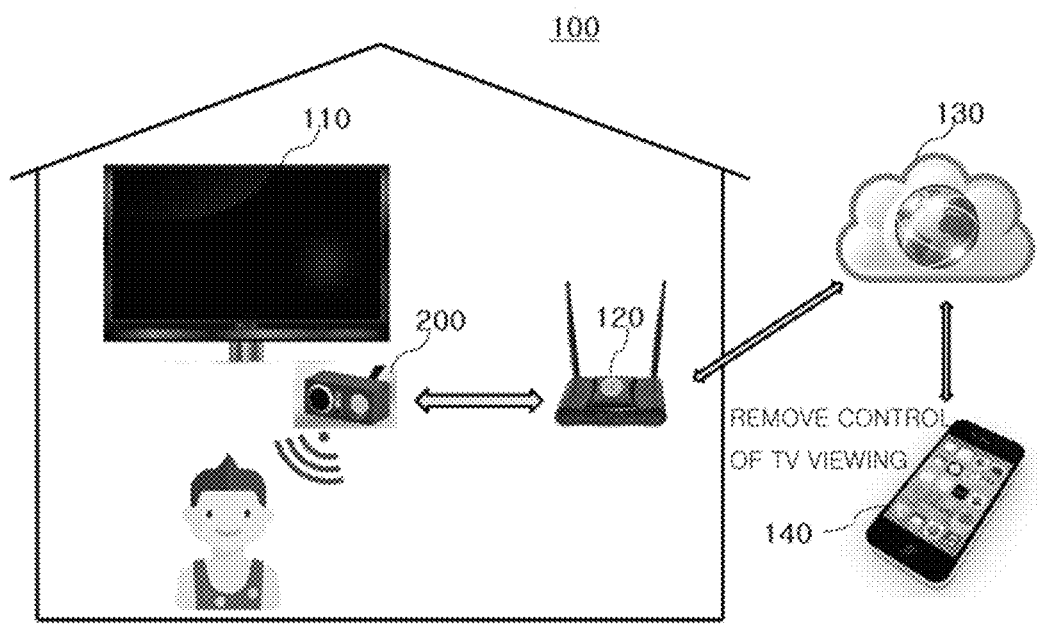
FIG. 1 is a diagram illustrating a configuration of a system for controlling television (TV) viewing that is capable of bi-directional video calling according to an embodiment of the present invention.

FIG. 1 is a diagram illustrating a configuration of a system for controlling television (TV) viewing that is capable of bi-directional video calling according to an embodiment of the present invention.

A system 100 for controlling TV viewing that is capable of bi-directional video calling according to the embodiment of the present invention includes a TV 110, a digital image source, a device 200 for controlling TV viewing, a communication network 130, and a smart phone 140.

The TV 110 includes any type of TV such as a network TV, an Internet TV, a smart TV, or the like.

The digital image source is a device that receives multimedia data including image information and transmits the multimedia data to the TV 100, such as a computer, a digital video recorder, and the like, and the digital image source according to the present invention is illustrated as a set-top box 120.

The communication network 130 may include not only a data communication network, such as a local area network (LAN), a metropolitan area network (MAN), a wide area network (WAN), the Internet, etc., but also a telephone network, and may include both a wired network and a wireless network.

The smart phone 140 includes a desktop personal computer (PC), a tablet PC, and the like, as long as it is a device capable of a web service (internet communication) and including an input function, a communication function, a screen output function, and a touch screen function.

The smart phone 140 has a service application embedded therein that interworks with the set-top box 120 and the device 200 for controlling TV viewing to perform video calls, security functions, and TV viewing control functions by implementing a TV interactive content control service.

The device 200 for controlling TV viewing has one side connected to the set-top box 120, the other side connected to the TV 110 through a high-definition multimedia interface (HDMI) cable 205, and performs bi-directional communication through the smart phone 140 through the communication network 130.

The device 200 for controlling TV viewing performs video and voice calls through bi-directional communication between the TV 110 and the smart phone 140.

Figure 2:
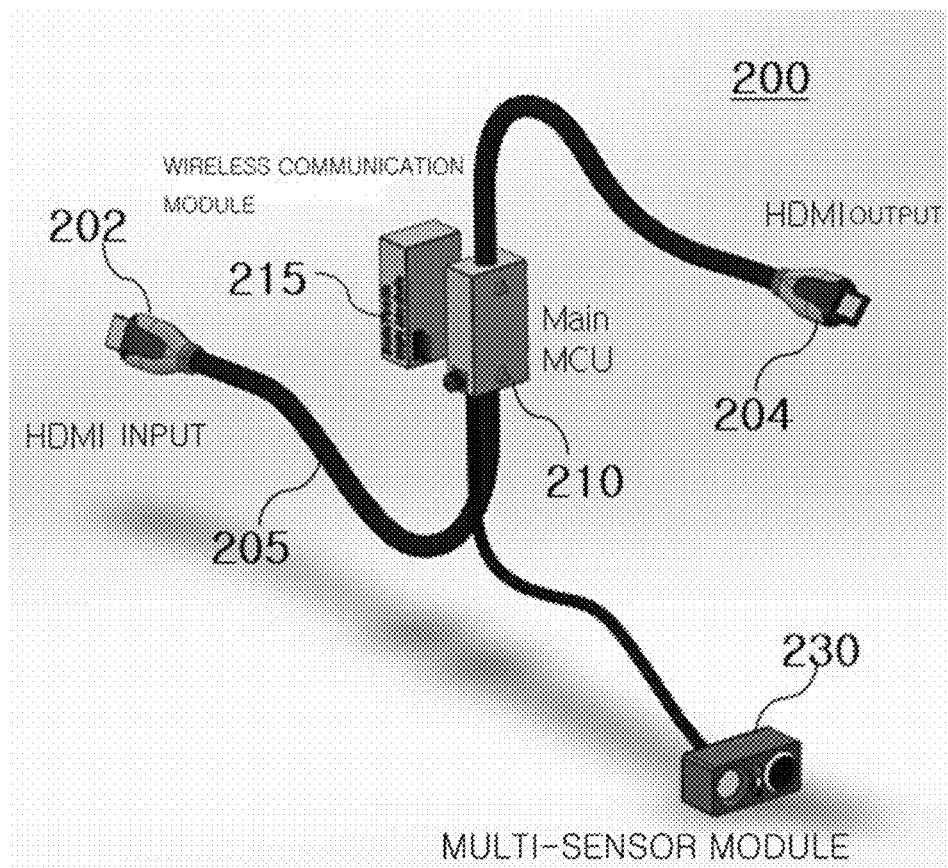
FIGS. 2 and 3 are diagrams illustrating a configuration of a device for controlling TV viewing capable of bi-directional video calling according to a first embodiment of the present invention.
Figure 3:
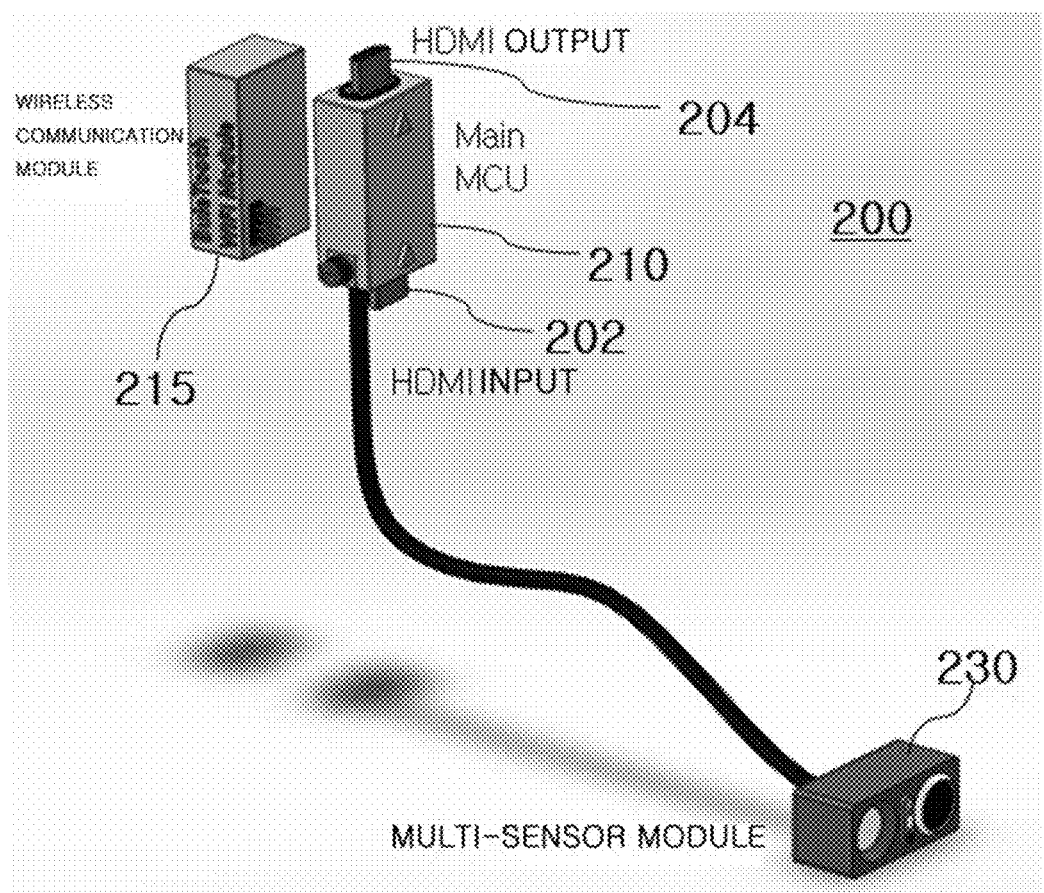
Figure 4:
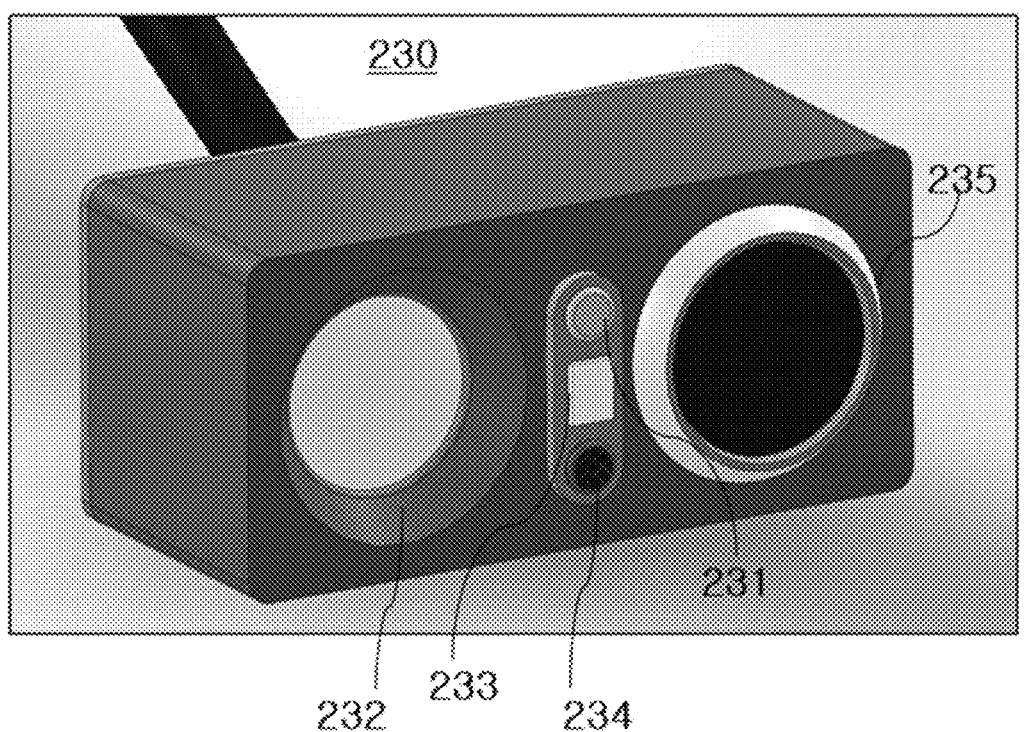
FIG. 4 is a diagram illustrating an exterior of a multi-sensor module according to the first embodiment of the present invention.
Figure 5:
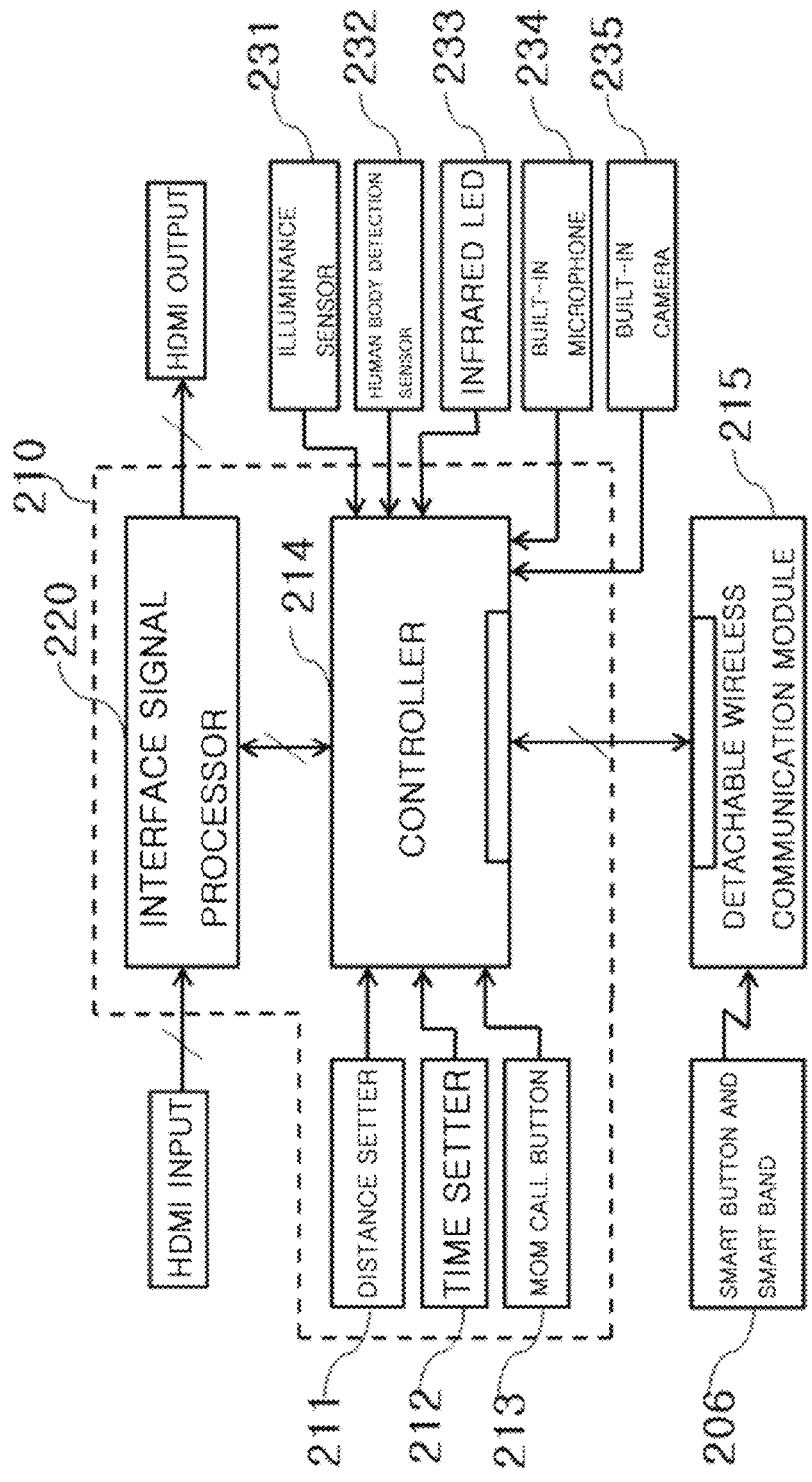
FIG. 5 is a block diagram illustrating a configuration of a control module according to the first embodiment of the present invention.
Figure 6:
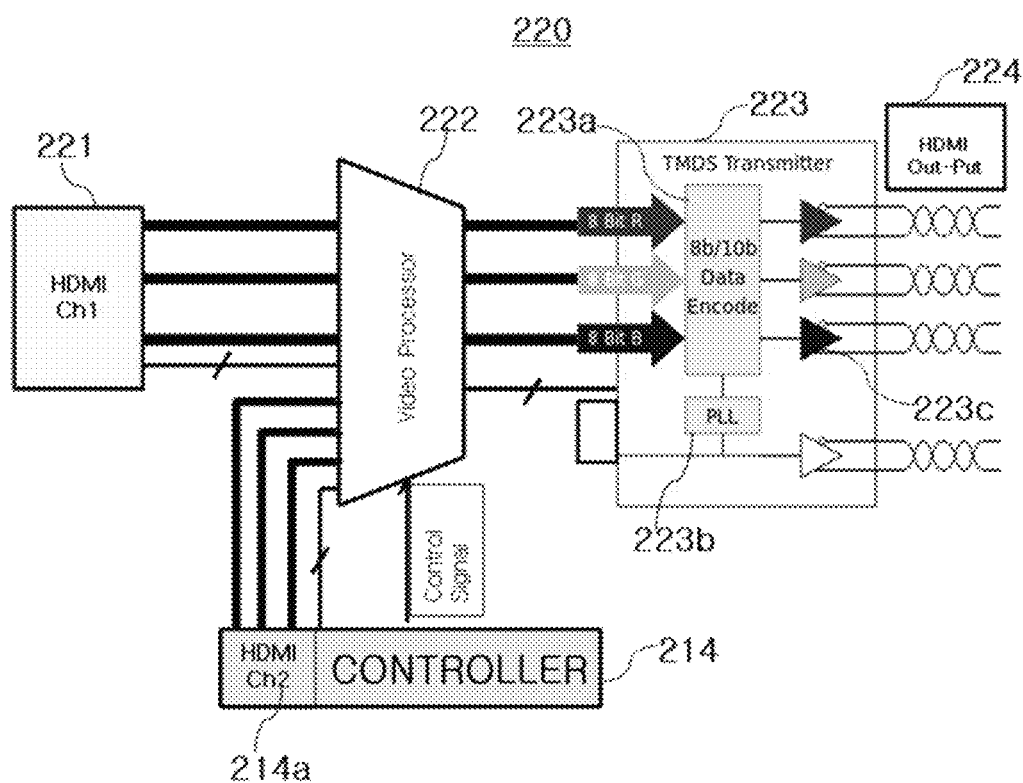
FIG. 6 is a diagram illustrating a configuration of an interface signal processor according to the first embodiment of the present invention.

FIGS. 2 and 3 are diagrams illustrating a configuration of a device for controlling TV viewing capable of bi-directional video calling according to a first embodiment of the present invention, FIG. 4 is a diagram illustrating an exterior of a multi-sensor module according to the first embodiment of the present invention, FIG. 5 is a block diagram illustrating a configuration of a control module according to the first embodiment of the present invention, and FIG. 6 is a diagram illustrating a configuration of an interface signal processor according to the first embodiment of the present invention.

The device 200 for controlling TV viewing that is capable of bi-directional video calling according to the first embodiment of the present invention includes an HDMI input connector 202, an HDMI output connector 204, a control module 210, a wireless communication module 215, and a multi-sensor module 230.

FIG. 2 illustrates a plug type device 200 for controlling TV viewing, and FIG. 3 illustrates a jack type device 200 for controlling TV viewing.

The HDMI input connector 202 is an HDMI connector mounted on an HDMI interface unit (not shown) of the set-top box 120, and the HDMI input connector 202 according to the present invention is connected to the set-top box 120 of the TV 110 and connected to the control module 210 through an HDMI cable 205.

The HDMI output connector 204 is connected to a terminal of the TV 110 through the HDMI cable 205.

The control module 210 includes an interface signal processor 220, a distance setter 211, a time setter 212, an embedded Mom Call button 213, and a controller 214, and the wireless communication module 251 is coupled to the controller 214. Here, the wireless communication module 251 may be detachably coupled to or embedded in the controller 214.

The interface signal processor 220 receives an HDMI image data signal through the HDMI input connector 202 and transmits the HDMI image data signal to the HDMI output connector 204.

The interface signal processor 220 blocks or transmits the HDMI image data signal output to the TV 110 under the control of the controller 214. In the following description, the HDMI image data signal refers to an HDMI signal and is described as an image data signal for the sake of convenience in description.

Referring to FIG. 4, the multi-sensor module 230 includes an illuminance sensor 231, a human body detection sensor 232, an infrared light emitting diode (LED) 233, a built-in microphone 234, and a built-in camera 235.

The illuminance sensor 231 generates an illuminance sensor value by measuring the intensity of light of surroundings and transmits the generated illuminance sensor value to the controller 214.

The human body detection sensor 232 emits infrared rays to a subject, receives infrared rays emitted from the subject to detect a movement of the subject, and transmits infrared data emitted from the subject according to a sensor output value generated from the detected movement to the controller 214.

The infrared LED 233 emits infrared rays to a subject so that image capturing is facilitated even under low-illuminance conditions such as at night.

The built-in microphone 234 collects and generates a voice signal of a TV viewer and transmits the generated voice signal to the controller 214.

The built-in camera 235 generates an image signal by capturing an image of a TV viewer and transmits the generated image signal to the controller 214.

Referring to FIG. 6, the interface signal processor 220 will be described in more detail below.

The interface signal processor 220 includes a first HDMI inputter 221, a video processor 222, a transition minimized differential signaling (TMDS) transmitter 223, and an HDMI outputter 224, and the controller 214 includes a second HDMI inputter 214a for bi-directional video and voice calling using the TV 110.

The first HDMI inputter 221 receives an HDMI image data signal from the HDMI input connector 202. The first HDMI inputter 221 receives image data signals through channels of three colors of red (R), green (G), blue (B), and each channel of R, G, or B is composed of an 8-bit image data signal.

The interface signal processor 220 is described as a configuration configured to process an image data signal through the HDMI inputter but is not limited thereto, and the interface signal processor 220 may be configured to block or transmit a digital voice data signal.

The conventional interface signal processor 220 configures the HDMI input as one channel, but the interface signal processor 220 according to the present invention configures the HDMI input as two channels so that an HDMI signal received through wireless communication may be used for TV output.

Accordingly, the present invention enables bi-directional video and voice calls using the TV 110 without a separate communication device.

The video processor 222 is provided with a switch array including a plurality of first switches each corresponding to one of first channels R, G, and B of the first HDMI inputter 221 and a plurality of second switches each corresponding to one of second channels R, G, and B of the second HDMI inputter 214a so that the video processor 222 is switched based on each channel by receiving a control signal (on/off signal) from the controller 214.

The controller 214 compares the illuminance sensor value received from the illuminance sensor 231 with a preset reference value and, in response to the illuminance sensor value being 100% of the reference value, adjusts image data signals of R, G, and B channels among image data signals input to the video processor 222 with 100% of the R channel, 100% of the G channel, and 100% of the B channel. The video processor 222 transmits the image data signals adjusted with 100% of the R channel, 100% of the G channel, and 100% of the B channel to the TMDS transmitter 223.

The controller 214 compares the illuminance sensor value received from the illuminance sensor 231 with a preset reference value and, in response to the illuminance sensor value being 50% of the reference value, adjusts image data signals of R, G, and B channels among image data signals input to the video processor 222 with 50% of the R channel, 50% of the G channel, and 50% of the B channel. The video processor 222 transmits the image data signals adjusted with 50% of the R channel, 50% of the G channel, and 50% of the B channel to the TMDS transmitter 223.

The controller 214 may adjust the brightness of the TV screen according to external illuminance by collectively adjusting the R channel signal, the G channel signal, and the B channel signal on the basis of the illuminance sensor value received from the illuminance sensor 231. That is, the controller 214 may adjust the screen illumination according to the amount of ambient light such that the screen illumination is bright in a bright place and is dimmed in a dark place to automatically protect eyesight of a TV viewer.

The controller 214 may adjust blue light by adjusting the adjustment ratio of a B channel signal among TMDS signals according to a preset blue light adjustment ratio.

When a blue light adjustment ratio is set to 50%, the controller 214 compares the illuminance sensor value received from the illuminance sensor 231 with a preset reference value, and in response to the illuminance sensor value being 100% of the reference value, adjusts image data signals of R, G, and B channels among image data signals input to the video processor 222 with 100% of the R channel, 100% of the G channel, and 50% of the B channel. The video processor 222 transmits the image data signals adjusted with 100% of the R channel, 100% of the G channel, and 50% of the B channel to the TMDS transmitter 223.

When a blue light adjustment ratio is set to 50%, the controller 214 compares the illuminance sensor value received from the illuminance sensor 231 with a preset reference value and, in response to the illuminance sensor value being 50% of the reference value, adjusts image data signals of R, G, and B channels among image data signals input to the video processor 222 with 50% of the R channel, 50% of the G channel, and 25% of the B channel. The video processor 222 transmits the image data signals adjusted with 50% of the R channel, 50% of the G channel, and 25% of the B channel to the TMDS transmitter 223.

In other words, the controller 214 performs control to receive an illuminance sensor value received from the illuminance sensor 231, adjusts image data signals of R, G, and B channels among input data signals according to the received illuminance sensor value, and readjusts the image data signal of the B channel among the input data signals according to a preset blue right adjustment ratio.

The controller 214 detects the brightness of ambient light using the illuminance sensor 231 and automatically adjusts the brightness and blue light of the TV screen, thereby providing an effect of a change in natural sunlight.

The TMDS transmitter 223 receives the image data signals transmitted from the first HDMI inputter 221 or the image data signals transmitted from the second HDMI inputter 214a according to channel R, G, and B and converts the image data signal to a TMDS level signal for each channel and output the TDMS level signal. The TMDS transmitter 223 includes an encoder 223a, a phase locked loop (PLL) circuit 223b, and a plurality of differential amplifiers 223c.

The encoder 223a is synchronized with a clock signal output from the PLL circuit 223b to encode the image data signal or the voice data signal transmitted from the first HDMI inputter 221 or the second HDMI inputter 214a into a TDMS level signal for each channel. The PLL circuit 223b outputs a clock signal to the encoder 223a.

The HDMI outputter 224 receives the TMDS level signal output from the TMDS transmitter 223 and the clock signal and outputs the received TMDS level signal and the clock signal to the HDMI output connector 204 to be transmitted to the TV 110. The TV 110 receives the TMDS level signal and the clock signal transmitted from the HDMI output connector 204 through a TMDS receiver (not shown) and decodes the TMDS level signal and the clock signal into an image data signal, and outputs an image.

The set-top box 120 transmits and receives various types of interactive content by wirelessly communicating with the smart phone 140 and transfers transmitted/received various types of control data and content to the controller 214 of the device 200 for controlling TV viewing.

The controller 214 is connected to the set-top box 120 and receives a control signal that is generated by manipulation of the smart phone 140 and received through the set-top box 120.

The smart phone 140 may transmit a control signal for interactive content to the controller 214 of the device 200 for controlling TV viewing through the set-top box 120 to thereby control TV viewing like a remote control.

The controller 214 generates a user identification number required for mapping between the set-top box 120 located in the home and the smart phone 140 owned by the user. Here, the user identification number is a key value for identifying the smart phone 140 that receives the interactive digital TV. For example, a subscriber number, a set-top box internet protocol (IP) address, a subscriber phone number, a set-top box medium access control (MAC) address, a subscriber resident number, and the like may be used as the user identification number.

The controller 214 serves to receive a control signal for TV interactive content received from the smart phone 140 according to processing of a one-to-one mapping request with the smart phone 140 received from the set-top box 120 and executing of interactive content, transmit an event signal to the set-top box 120 to be transmitted to the smart phone 140, and transmit and receive various pieces of data with the set-top box 120 such that interactive content is transmitted to or received from the smart phone 140.

The controller 214 receives a phone number registration request signal from the smart phone 140 through the set-top box 120 for one-to-one mapping with the set-top box 120 and performs registration processing by mapping the phone number of the smart phone 140 to a user identification number of the set-top box 120 in one to one correspondence.

The controller 214, in response to receiving a phone number registration request signal from the smart phone 140 through the set-top box 120, may perform authentication processing through an authentication number to verify the validity of the phone number of the smart phone 140.

The smart phone 140 accesses the device 200 for controlling TV viewing through the set-top box 120, retrieves a reception illuminance sensor value from the illuminance sensor 231 to generate a brightness adjustment control signal capable of partially or entirely changing image data signals of R, G, and B channels, and transmits the generated brightness adjustment control signal to the controller 214 of the device 200 for controlling TV viewing through the communication network 130 and the set-top box 120.

The controller 214, in response to receiving the brightness adjustment control signal from the smart phone 140, may adjust the R channel signal, the G channel signal, and the B channel signal to thereby control the brightness of the TV screen according to external illumination.

The smart phone 140 generates a blue light change signal capable of changing the blue light adjustment ratio and transmits the blue light change signal to the controller 214 of the device 200 for controlling TV viewing through the communication network 130 and the set-top box 120.

The controller 214, in response to receiving the blue light change signal from the smart phone 140, adjusts the B channel signal, reprocesses the image data signal of the B channel in which blue light has been adjusted, and outputs the image data signal.

The controller 214 detects the position of a viewer from the human body detection sensor 232, emits infrared rays to the viewer and receive infrared rays emitted from the viewer to calculate distance information and, based on the calculated distance information being detected within distance information preset by the distance setter 211, blocks an image data signal output from the interface signal processor 220 by turning off the function of the video processor 222.

The controller 214 detects the position of a viewer from the human body detection sensor 232, counts a viewing time from the point in time at which the position is detected, and upon the counted viewing time being determined to be more than time information preset by the time setter 212, blocks an image data signal output from the interface signal processor 220 by turning off the function of the video processor 222.

The smart phone 140 accesses the device 200 for controlling TV viewing through the set-top box 120, retrieves distance information between the viewer and the TV and counted viewing time information, generates a control signal for blocking the image data signal, and transmits the control signal to the controller 214 of the device 200 for controlling TV viewing through the communication network 130 and the set-top box 120.

The controller 214, in response to receiving a control signal for blocking the image data signal from the smart phone 140, turns off the function of the video processor 222 to block the image data signal output from the interface signal processor 220.

The smart phone 140 may generate a control signal for changing the distance information preset by the distance setter 211 and transmit the control signal to the controller 214 of the device 200 for controlling TV viewing or may generate a control signal for changing the time information preset by the time setter 212 and transmit the control signal to the controller 214 of the device 200 for controlling TV viewing.

The smart phone 140, in response to the calculated distance information being detected within the distance information preset by the distance setter 211, generates warning voice information instructing a user to step several meters back from the TV 110 and transmits the warning voice information to the controller 214 of the device 200 for controlling TV viewing.

The smart phone 140, in response to determining the counted viewing time to be greater than or equal to the time information preset by the time setter 212, generates warning voice information for terminating TV viewing and transmits the warning voice information to the controller 214 of the device 200 for controlling TV viewing.

The controller 214 controls the video processor 222 to process a voice data signal of the warning voice through the first HDMI inputter 221 or the second HDMI inputter 214*a* and transmits the processed voice data signal to the TV 110 through the HDMI outputter 224 to output warning voice information.

Figure 7:
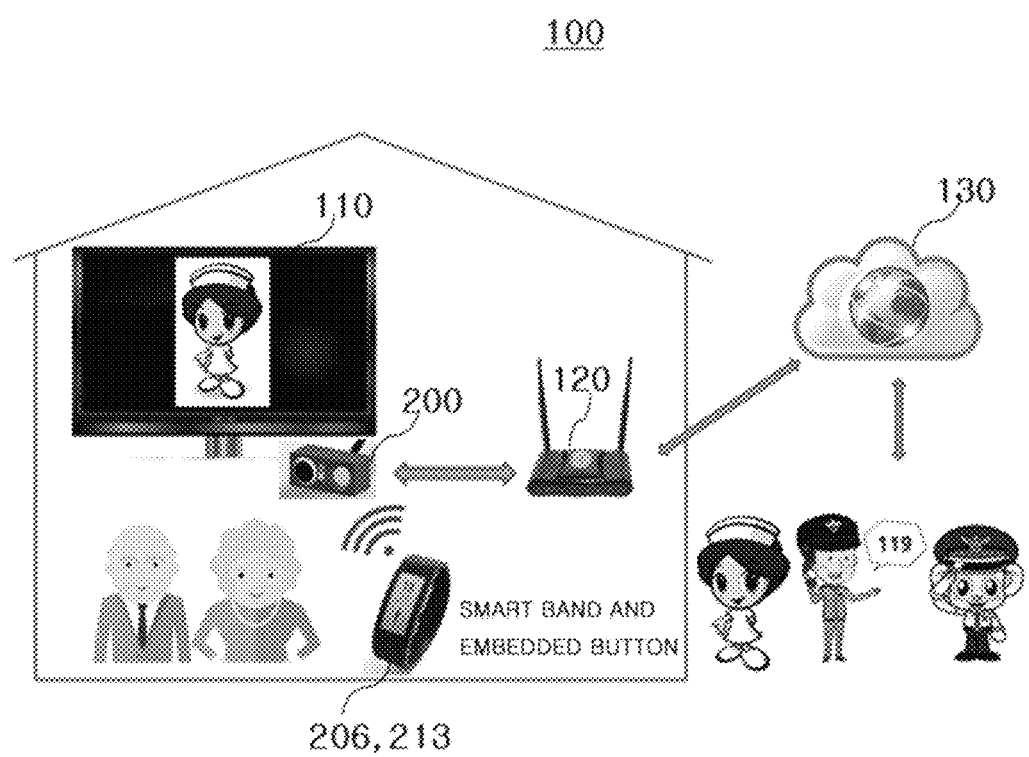
FIG. 7 is a diagram illustrating a configuration of a device for controlling TV viewing capable of bi-directional video calling according to a second embodiment of the present invention.

FIG. 7 is a diagram illustrating a configuration of a device for controlling TV viewing capable of bi-directional video calling according to a second embodiment of the present invention.

Referring to FIG. 7, an embedded Mom Call button 213 installed on one side of the control module 210 or an external smart button and smart band 206 installed on a smart band and an external device (not shown) support a video call between a TV 110 and a smart phone 140 by a simple button operation in case of an emergency situation of the elderly, infants, and children who have difficulty in using a separate communication device.

The embedded Mom Call button 213 or the external smart button and smart band 206, upon power being selected by a user and a selection button being pressed, generates a call button on signal for a video call and transmits the call button on signal to a controller 214 through a wireless communication module 215.

The controller 214, in response to receiving a call button-on signal for performing a video call from the embedded Mom Call button 213 or the external smart button and smart band 206 through the wireless communication module 215, generates a video call request signal for requesting a video call and transmits the video call request signal to the previously registered phone number of the smart phone 140 through a set-top box 120. Here, the controller 214 may transmit the video call request signal to the previously registered phone number of the smart phone 140 through the wireless communication module 215 in a wireless communication method rather than through the set-top box 120.

The smart phone 140, in response to receiving the video call request signal for requesting a video call from the set-top box 120, generates a response signal corresponding to the received video call request signal and transmits the generated response signal to the controller 214 through the set-top box 120.

The controller 214, in response to receiving the response signal to the video call request signal from the smart phone 140, performs a video and voice call protocol to enable a video call to configure an environment in which a video call between the TV 110 and the smart phone 140 is performable.

Subsequently, the controller 214 transmits an image captured by the built-in camera 235 to the smart phone 140 and receives an image data signal and a voice data signal from the smart phone 140 through the set-top box 120 and transmits the image data signal and the voice data signal to the TV 110 through the first HDMI inputter 221, the video processor 222, and the HDMI outputter 224 to thereby perform bi-directional video calling between the built-in camera 235, the TV 110, and the smart phone 140. In this case the controller 214 receives an image data signal and a hot plug detect signal from the set-top box 120 in preparation for a situation in which the TV 110 is in a turn-off state during a video call.

The controller 214 feeds back a certain voltage (for example, a 5V signal) of the HDMI signal as a hot plug detect signal to determine whether the TV 110 is turned on according to whether the hot plug detect signal is detected.

Accordingly, when a hot plug detect signal is not received from the TV 110, the controller 214 determines that the TV 110 is turned off, generates a TV Power ON signal, and transmits the TV Power ON signal to the TV 110. Here, the TV Power ON signal is a signal for generating driving power driving the TV screen in a TV power supply of the TV 110 to turn on the TV screen.

The bi-directional communication between the TV 110 and the smart phone 140 described above is configured to be performed through the set-top box 120 but is not limited thereto, and image and voice data signals may be transmitted and received through the wireless communication module 215 coupled to the controller 214 without passing through the set-top box 120.

The controller 214, in response to image and voice data signals transmitted and received through the wireless communication module 215, may perform data processing through the second HDMI inputter 214a.

For example, the controller 214 may receive an image data signal and a voice data signal from the smart phone 140 through the wireless communication module 215 and transmit the image data signal and the voice data signal to the TV 110 through the second HDMI inputter 214a, the video processor 2222, and the HDMI outputter 224 to perform a video call.

Figure 8:
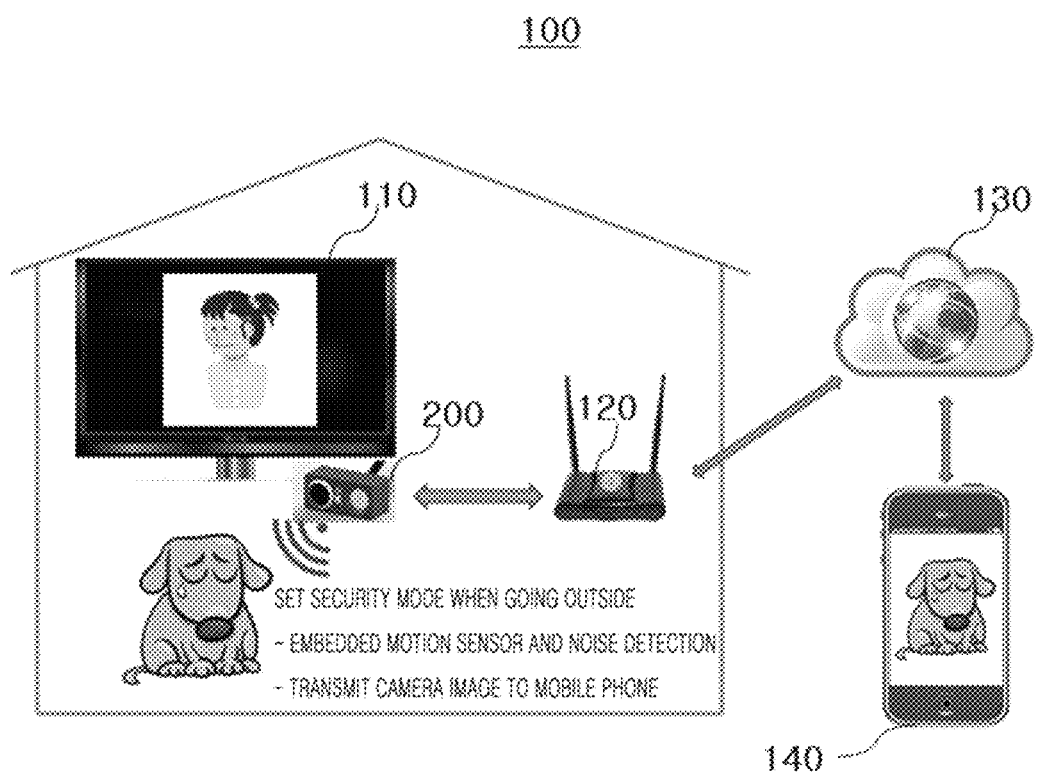
FIG. 8 is a diagram illustrating a configuration of a device for controlling TV viewing capable of bi-directional video calling according to a third embodiment of the present invention.

FIG. 8 is a diagram illustrating a configuration of a device for controlling TV viewing capable of bi-directional video calling according to a third embodiment of the present invention.

The controller 214, in response to a setting signal of a security function mode being received, operates the human body detection sensor 232 to emit infrared rays to a subject and receive infrared rays emitted from the subject to detect movement of the subject.

The controller 214, in response to a sensor output value generated from the movement sensed by the human body detection sensor 232, generates a control signal for automatically capturing an image of the subject and transmits the control signal to the built-in camera 235. In this case, the controller 214 operates the built-in microphone 234 to acquire and collect voice information of surroundings.

The controller 214 transmits the image information captured by the built-in camera 235 and the voice information collected through the built-in microphone 234 to the smart phone 140 through the set-top box 120 or the wireless communication module 215.

The smart phone 140, in response to an alarm button provided at one side that is selected, generates an alarm button selection signal and transmits the alarm button selection signal to the controller 214 through the set-top box 120. The controller 214, in response to receiving the alarm button selection signal, outputs preset alarm information through a speaker. Here, the alarm information includes a siren sound, a warning message instructing to leave the house as a sound, and a combination of the sounds.

The controller 214, in response to receiving a sensor output value indicating no movement detected from the human body detection sensor 232 for a preset time, generates a photographing stop signal and transmits the photographing stop signal to the built-in camera 235.

The controller 214, in response to receiving a setting signal of a security function mode, receives an illuminance sensor value measuring the intensity of surrounding light from the illuminance sensor 231 and, upon determining that the received illuminance sensor value is less than a preset reference value (a condition of low illumination, at night, etc.), operates the infrared LED 233 to execute a security function mode capable of responding to low illumination or at night.

The controller 214, in response to a setting signal of a companion animal mode being received, performs to control to detect surrounding noise through the built-in microphone 234 of the multi-sensor module 230 and, in response to a characteristic sound wave of a pet dog greater than or equal to a certain level continuing, generate a TV Power On signal for turning on the screen of the TV, transmit the TV Power On signal to the TV 110, transmit an image signal and a voice signal of the built-in camera 235 and the built-in microphone 234 to the smart phone 140, and transmit image and voice signals of the smart phone 140 to the TV 110.

In the above, the embodiments of the present invention are not only implemented through a device and/or a method but may be implemented through a program for realizing functions corresponding to the configuration of the embodiment of the present invention, a recording medium in which the program is recorded, or the like. The implementation may be easily achieved ty those skilled in the art from the description of the above-described embodiment.

Although the embodiments of the present invention have been described in detail, it should be understood that various substitutions, additions, and modifications are possible without departing from the scope and spirit of the present invention by those skilled in the art using a basic concept of the present invention defined in the appended claims of the present invention.

In addition, although the present invention has been illustrated as an external device of a TV to implement the above described functions, the present invention, when embedded in a TV, may also be implemented with the same technical conditions.

The invention claimed is:

1. A device for controlling television (TV) viewing that allows bi-directional video call, the device comprising:
   a first high-definition multimedia interface (HDMI) inputter of a first channel configured to receive a first image data signal from an HDMI input connector mounted on a set-top box;
   an HDMI outputter configured to output a signal processed image data signal to an HDMI output connector mounted on a TV;
   a video processor having an input terminal connected to the HDMI input connector and an output terminal connected to the HDMI output connector and configured to receive the first image data signal from the HDMI input connector, perform signal processing on the first image data signal according to a plurality of channels, and output the signal processed first image data signal to the HDMI output connector;
   a controller provided with a second HDMI inputter of a second channel for a video and voice call and configured to receive an HDMI signal through the second HDMI inputter, transmit the received HDMI signal to the video processor, and control the video processor to perform signal processing on an image data signal and a voice data signal that are input through the first HDMI inputter and the second HDMI inputter;
   a wireless communication module connected to the controller and configured to receive the HDMI signal through wireless communication;
   an embedded Mom Call button configured to, upon receiving a power signal for a button, generate a call button ON-signal for a video call and transmit the generated call button ON-signal to the controller through the wireless communication module; and
   a multi-sensor module electrically connected to the controller and provided with a built-in camera configured to capture an image of surroundings to generate an image signal and transmit the image signal to the controller, wherein the controller is configured to, in response to receiving the call button ON-signal from the embedded Mom Call button, generate a video call request signal for requesting a video call to transmit the generated video call request signal to a previously registered phone number of a smart phone through the set-top box and, in response to receiving a response signal to the video call request signal from the smart phone, perform a video and voice call protocol to enable a video call to configure a communication environment in which the TV and the smart phone perform the video call, wherein the controller is configured to transmit the image captured by the built-in camera to the smart phone, receive an image data signal and a voice data signal from the smart phone through the wireless communication module to transmit the image data signal and the voice data signal to the TV through the second HDMI inputter, the video processor, and the HDMI outputter to perform a bi-directional video call between the built-in camera, the TV, and the smart phone, and the controller is configured to receive and process a control signal generated by manipulation of the smart phone such that the smart phone performing wireless communication transmits and receives interactive content, generate a response signal to the control signal transmitted from the smart phone, transmit the generated response signal to the smart phone, determine whether the TV is in an on state based on whether a hot plug detect signal is detected among the HDMI signals, determine that the TV is in an off state based on the hot plug detect signal not being detected from the TV, and generate a TV power ON signal and transmit the generated TV power ON signal to the TV.

2. A device for controlling television (TV) viewing that allows bi-directional video call, the device comprising:
a first high-definition multimedia interface (HDMI) inputter of a first channel configured to receive a first image data signal from an HDMI input connector mounted on a set-top box;
an HDMI outputter configured to output a signal processed image data signal to an HDMI output connector mounted on a TV;
a video processor having an input terminal connected to the HDMI input connector and an output terminal connected to the HDMI output connector and configured to receive the first image data signal from the HDMI input connector, perform signal processing on the first image data signal according to a plurality of channels, and output the signal processed first image data signal to the HDMI output connector;
a controller provided with a second HDMI inputter of a second channel for a video and voice call and configured to receive an HDMI signal through the second HDMI inputter, transmit the received HDMI signal to the video processor, and control the video processor to perform signal processing on an image data signal and a voice data signal that are input through the first HDMI inputter and the second HDMI inputter;
an interface signal processor configured to block or transmit an HDMI image data signal output to the TV according to control of the controller; and
a wireless communication module connected to the controller and configured to receive the HDMI signal through wireless communication, wherein the device further comprising a multi-sensor module electrically connected to the controller to receive an HDMI signal,
wherein the multi-sensor module includes:
an illuminance sensor configured to measure an intensity of light of surroundings, generate an illuminance sensor value, and transmit the generated illuminance sensor value to the controller;
a human body detection sensor configured to emit infrared rays to a subject and receive infrared rays emitted from the subject to detect movement of the subject;
an infrared light emitting diode (LED) configured to emit infrared rays to the subject;
a built-in microphone configured to collect voice signals of surroundings and transmit the voice signals to the controller; and
a built-in camera configured to capture an image of surroundings to generate an image signal and transmit the generated image signal to the controller,
wherein the controller is configured to adjust image data signals of a red (R) channel, a green (G) channel, and a blue (B) channel among input image data signals according to the illumination sensor value received from the illumination sensor to adjust a brightness of a screen of the TV,
the controller is configured to, in response to receiving a response signal to a video call request signal from a smart phone, perform a video and voice call protocol to enable a video call to configure a communication environment in which the TV and the smart phone perform the video call,
the controller is configured to transmit an image captured by the built-in camera to the smart phone, receive an image data signal and a voice data signal from the smart phone through the wireless communication module, and transmit the image data signal and the voice data signal to the TV through the second HDMI inputter, the video processor, and the HDMI outputter to perform a bidirectional video call between the built-in camera, the TV, and the smart phone, and
the controller is configured to receive and process a control signal generated by manipulation of the smart phone such that the smart phone performing wireless communication transmits and receives interactive content, generate a response signal to the control signal transmitted from the smart phone, transmit the generated response signal to the smart phone, determine whether the TV is in an on state based on whether a hot plug detect signal is detected among the HDMI signals, determine that the TV is in an off state based on the hot plug detect signal not being detected from the TV, and generate a TV power ON signal and transmit the generated TV power ON signal to the TV.

3. The device of claim 2, wherein the controller is configured to receive an illumination value received from the illumination sensor, adjust image data signals of the R channel, the G channel, and the B channel among output image data signals according to the illumination sensor value, and readjust an image data signal of the B channel among input image data signals according to a preset blue light adjustment ratio to adjust blue light.

4. The device of claim 2, wherein the controller is configured to perform control to detect a position of a viewer from the human body detection sensor, emit infrared rays to the viewer and receive infrared rays emitted from the viewer to calculate distance information and, in response to the calculated distance information being detected within distance information preset by a distance setter, block an image data signal output from the interface signal processor.

5. The device of claim 2, wherein the controller is configured to perform control to detect a position of a viewer from the human body detection sensor, count a viewing time from a point in time at which the position is detected, and in response to the counted viewing time being determined to be more than time information preset by a time setter, block an image data signal output from the interface signal processor.

6. The device of claim 2, wherein the controller is configured to, in response to a setting signal of a security function mode being received, operate the human body detection sensor to emit infrared rays to the subject, receive infrared rays emitted from the subject to detect movement of the subject, generate a control signal for automatically capturing an image of the subject, transmit the control signal to the built-in camera, operate the built-in microphone to acquire and collect voice information of surroundings, and transmit the captured image information and the voice information to the smart phone through the set-top box or the wireless communication module.

7. The device of claim 2, wherein the controller is configured to, in response to a setting signal of a companion animal mode being received, detect surrounding noise through the built-in microphone of the multi-sensor module and, in response to a characteristic sound wave of a pet dog greater than or equal to a certain level continuing, generate a TV Power On signal for turning on a screen of the TV and transmit the TV Power On signal to the TV, transmit the image signal and the voice signal of the built-in camera and the built-in microphone to the smart phone, and transmit image and voice signals of the smart phone to the TV.

* * * * *